(12) United States Patent
Shishido et al.

(10) Patent No.: US 7,614,791 B2
(45) Date of Patent: Nov. 10, 2009

(54) BEARING UNIT AND MOTOR USING THE SAME

(75) Inventors: Yuji Shishido, Kanagawa (JP); Makoto Chiyoda, Kanagawa (JP); Ichiro Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 349 days.

(21) Appl. No.: 11/650,954

(22) Filed: Jan. 9, 2007

(65) Prior Publication Data

US 2007/0253652 A1 Nov. 1, 2007

(30) Foreign Application Priority Data

Jan. 25, 2006 (JP) .............................. 2006-016802

(51) Int. Cl.
*F16C 32/06* (2006.01)

(52) U.S. Cl. ...................... 384/100; 384/107; 384/119; 360/99.08

(58) Field of Classification Search ................. 384/100, 384/107, 111–114, 118–124, 279, 903, 902; 29/898.042, 898.07, 898.09; 360/99.04, 360/99.07, 99.08; 417/423.12, 423.13, 354
See application file for complete search history.

(56) References Cited

U.S. PATENT DOCUMENTS

| | | | | |
|---|---|---|---|---|
| 4,934,836 A * | 6/1990 | Tanaka et al. | ............... | 384/100 |
| 5,337,374 A * | 8/1994 | Konishikawa | ............... | 384/107 |
| 5,924,851 A * | 7/1999 | Obata et al. | .............. | 417/424.1 |
| 6,250,807 B1 * | 6/2001 | Mori et al. | ................... | 384/100 |
| 6,379,129 B1 * | 4/2002 | Obara | ........................ | 384/512 |
| 6,390,681 B1 * | 5/2002 | Nakazeki et al. | ............ | 384/107 |
| 6,880,976 B2 * | 4/2005 | Huang et al. | ................ | 384/100 |
| 7,438,475 B2 * | 10/2008 | Yazawa et al. | ............. | 384/107 |
| 2004/0013329 A1 * | 1/2004 | Yamashita et al. | .......... | 384/100 |
| 2005/0044714 A1 * | 3/2005 | Yamashita et al. | ..... | 29/898.042 |
| 2005/0201864 A1 * | 9/2005 | Yoshida et al. | ............. | 416/206 |
| 2005/0220379 A1 * | 10/2005 | Yazawa et al. | ............. | 384/100 |

FOREIGN PATENT DOCUMENTS

| | | |
|---|---|---|
| JP | 2002-027703 A | 1/2002 |
| JP | 2004-340183 A | 12/2004 |
| JP | 2005-069382 | 3/2005 |
| WO | WO-03/027521 A1 | 4/2003 |

OTHER PUBLICATIONS

Japanese Office Action issued Jun. 9, 2009 for corresponding Japanese Application No. 2006-016802.

* cited by examiner

*Primary Examiner*—Marcus Charles
(74) *Attorney, Agent, or Firm*—Rader, Fishman & Grauer PLLC (57) ABSTRACT

A bearing unit wherein a radial bearing for bearing a shaft in the circumferential direction of the shaft and a metallic housing provided with an attaching section are integrated with each other by molding, a resin molded body formed by the molding is so formed as to sealingly contain the radial bearing therein and is provided on one end side in the axial direction thereof with a shaft passing hole through which to pass the shaft, and the inside of the resin molded body is filled with a viscous fluid, whereby the viscous fluid such as a lubricating oil can be prevented from leaking, and the bearing unit can be attached to an object easily and assuredly.

8 Claims, 8 Drawing Sheets

BEARING UNIT AND MOTOR USING THE SAME

CROSS REFERENCES TO RELATED APPLICATIONS

The present invention contains subject matter related to Japanese Patent Application JP 2006-016802, filed in the Japanese Patent Office on Jan. 25, 2006, the entire contents of which being incorporated herein by reference.

BACKGROUND OF THE INVENTION

1. Field of the Invention

The present invention relates to a bearing unit for rotatably bearing a rotating shaft or for bearing a rotating body rotatably relative to a shaft, and to a motor using the bearing unit.

2. Description of the Related Art

Figure 14A:
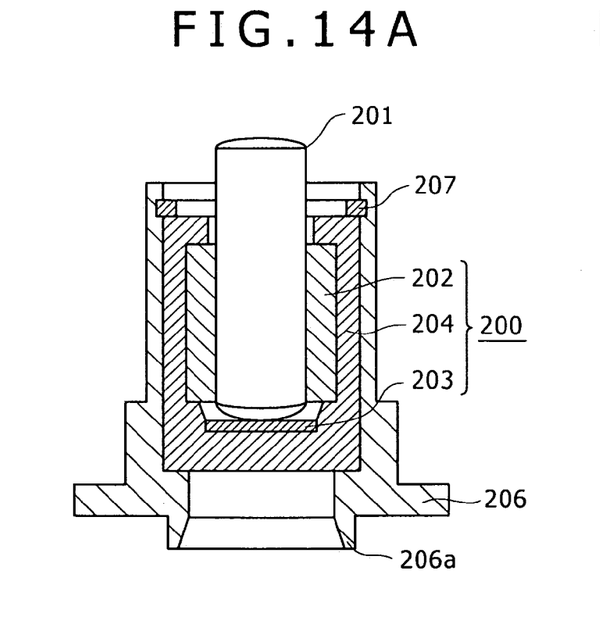
FIG. 14A is a sectional view showing the condition where the bearing unit is fastened to a metallic housing for attachment.
Figure 14B:
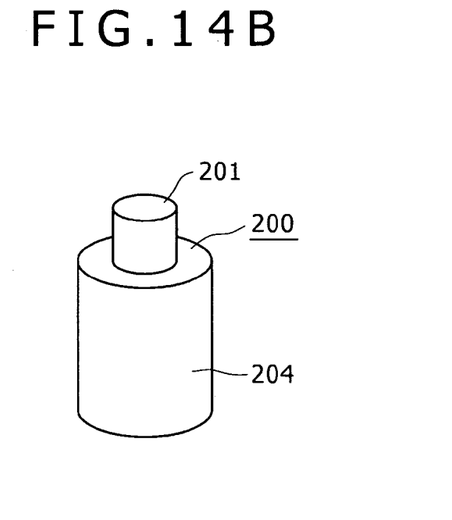
FIG. 14B is a perspective view of the bearing unit.

As a bearing unit for rotatably bearing a rotating shaft, one configured as shown in FIGS. 14A and 14B has been known.

The bearing unit 200 shown in FIGS. 14A and 14B is for rotatably bearing a rotating shaft 201, and includes a radial bearing section 202 such as a slide bearing for bearing the rotating shaft 201 in the circumferential direction of the rotating shaft 201, a thrust bearing section 203 for bearing one end in the thrust direction of the rotating shaft 201, and a resin-made housing 204 which has the radial bearing section 202 and the thrust bearing section 203 therein and is filled with a viscous fluid such as a lubricating oil. The housing 204, exclusive of a shaft passing hole through which to pass the rotating shaft 201, is sealed, whereby leakage of the lubricating oil is restrained as assuredly as possible.

In the bearing unit 200, the housing 204 is made of a resin, so that it is low in adhesion strength and mechanical strength. Therefore, for attaching the bearing unit 200 to an object such as a stator of a motor, for example, it may be necessary to fasten the bearing unit 200 to a metallic housing 206 provided with a caulking part 206a for attachment to the object. As for the method of fastening the bearing unit 200 to the metallic housing 206, fixing with a C-ring 207 or careful caulking may be needed, since it is difficult to adhere the resin-made housing 204 of the bearing unit 200 or the resin of the housing 204 is liable to be deformed due to mechanical fastening such as press fitting.

Thus, the bearing unit 200 according to the related art is less susceptible to leakage of the lubricating oil and is high in reliability, but has the problem that at the time of attaching the bearing unit 200 to an object, the configuration and the attaching process may be complicated due to the use of a C-ring or the like, or the attaching process may be complicated due to careful caulking. For reference, see Japanese Patent Laid-open No. 2005-69382 as Patent Document 1.

SUMMARY OF THE INVENTION

Thus, there is a need to provide a bearing unit in which leakage of a viscous fluid such as a lubricating oil can be prevented and which can be attached to an object easily and assuredly, and a motor using the bearing unit.

According to one embodiment of the present invention, there is provided a bearing unit wherein a radial bearing for bearing a shaft in the circumferential direction of the shaft and a metallic housing provided with an attaching section are integrated with each other by molding, a resin molded body formed by the molding is so formed as to sealingly contain the radial bearing, and is provided on one end side in the axial direction thereof with a shaft passing hole through which to pass the shaft, and the inside of the resin molded body is filled with a viscous fluid.

According to another embodiment of the present invention, there is provided a motor including a bearing unit for bearing a rotor rotatably relative to a stator, wherein the bearing unit used for the motor is a bearing according to the one embodiment of the invention.

The bearing unit and the motor using the bearing unit, according to embodiments of the present invention, are advantageous in that the bearing unit can be attached to an object easily and assuredly and that leakage of the viscous fluid such as a lubricating oil can be prevented.

BRIEF DESCRIPTION OF THE DRAWINGS

FIGS. 4A to 4C show other examples of an attaching section provided in a housing of the bearing unit according to one embodiment of the present invention, in which

FIGS. 14A and 14B show a bearing unit according to the related art, in which

DETAILED DESCRIPTION OF THE PREFERRED EMBODIMENTS

Now, embodiments of a bearing unit and a motor using the bearing unit pertaining to application of the present invention will be described below, referring to the accompanying drawings.

Here, a motor for use in a heat radiating device provided in an electronic apparatus such as a portable type computer, which is an information processing apparatus for arithmetic processing and the like of various kinds of information. The portable computer or the like is provided therein with the heat radiating device. The heat radiating device includes a metallic base, a motor 1 mounted onto the base, a fan 3 rotated by the motor 1, a fan case 4 accommodating the fan 3, and a heat sink. The motor 1 for rotatingly driving the fan 3 in the heat radiating device will be described in detail below.

Figure 1:
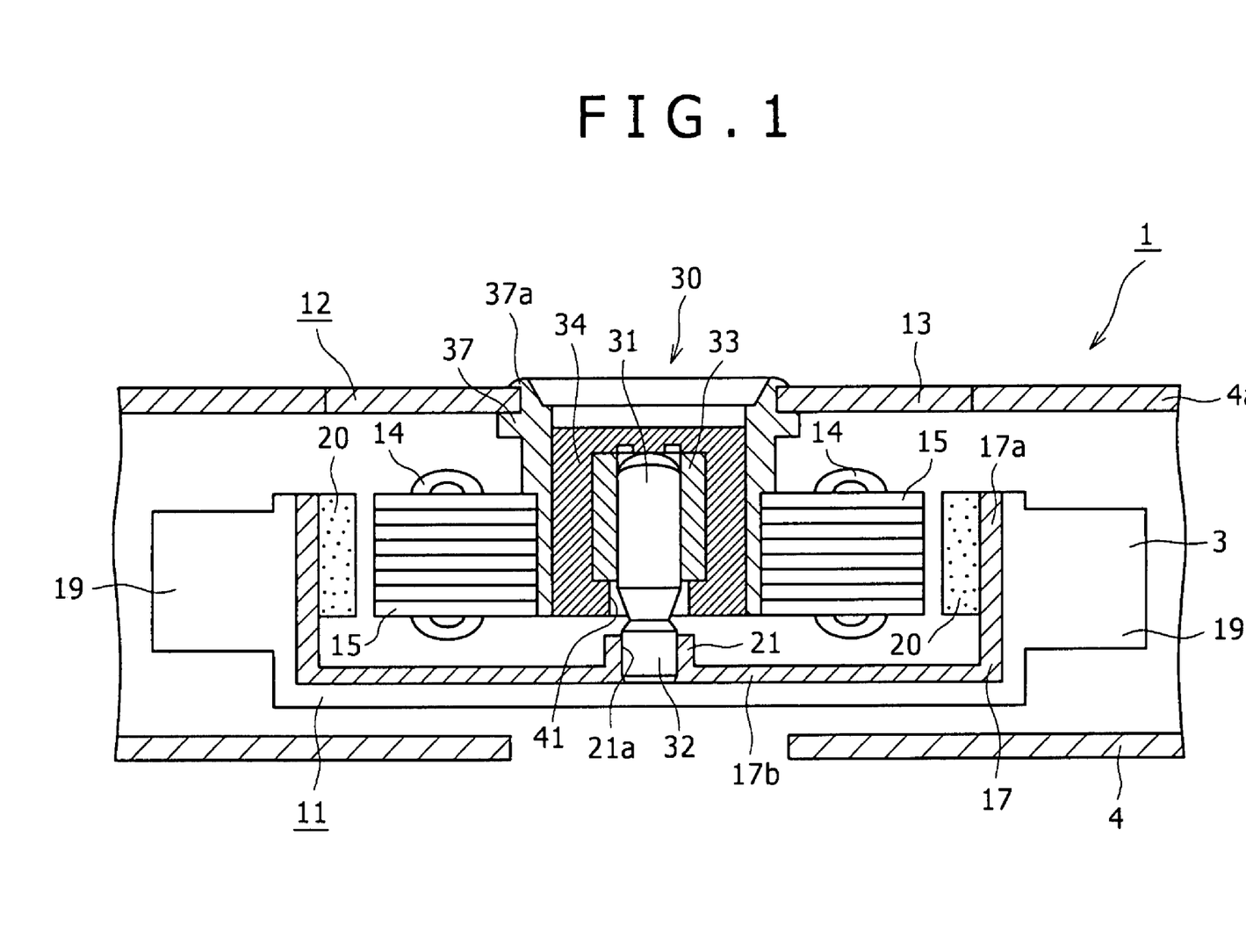
FIG. 1 is a sectional view showing the configuration of a motor to which an embodiment of the present invention is applied.

The motor 1 using a bearing unit 30 according to one embodiment of the present invention includes a rotor 11 and a stator 12, as shown in FIG. 1

The stator 12 is integrally provided on the side of a top plate 4a of the fan case 4 accommodating the fan 3 rotated by the motor 1 as well as the motor 1. The stator 12 includes a stator yoke 13, the bearing unit 30 according to one embodiment of the present invention, a coil 14, and a core 15 on which the coil 14 is wound. The stator yoke 13 may be formed as one body with the top part 4a of the fan case 4, i.e., composed of a part of the fan case 4, or may be formed separately from the fan case 4. The stator yoke 13 is formed, for example, of iron. The bearing unit 30 is fixed to the stator yoke 13 by caulking a caulking part 37a provided as an attaching section in a housing (described later).

As shown in FIG. 1, the core 15 on which the coil 14 to be supplied with a driving current is wound is attached to an outer peripheral portion of the bearing unit 30 integrally fixed to the stator yoke 13.

The rotor 11 constituting the motor 1 together with the stator 12 is attached to a rotating shaft 31 rotatably borne by the bearing unit 30, and is rotated as one body with the rotating shaft 31. The rotor 11 includes a rotor yoke 17, and the fan 3 having a plurality of vanes 19 rotated as one body with the rotor yoke 17. The vanes 19 of the fan 3 are formed as one body with the rotor yoke 17 by outsert molding on the outer peripheral surface of the rotor yoke 17.

On the inner peripheral surface of a tubular part 17a of the rotor yoke 17, a ring-shaped rotor magnet 20 is provided so as to face the coil 14 of the stator 12. The magnet 20 is a plastic magnet provided with S poles and N poles alternately provided along the circumferential direction thereof, and is fixed to the inner peripheral surface of the rotor yoke 17 with an adhesive.

The rotor yoke 17 is attached to be rotatable as one body with the rotating shaft 31 borne on the bearing unit 30, by a process in which a boss part 21 provided with a through-hole 21a provided at a central portion of a flat plate part 17b is press fitted to an attaching part 32 provided on the tip end side of the rotating shaft 31.

In the motor 1 configured as above, when a driving current in a predetermined current passing pattern is supplied from a driving circuit part provided in the exterior of the motor 1 to the coil 14 on the stator 12 side, the rotor 11 is rotated as one body with the rotating shaft 31, under the reaction between a magnetic field generated in the coil 14 and magnetic fields generated from the rotor magnet 20 on the rotor 11 side. With the rotor 11 thus rotated, the fan 3 having the plurality of vanes 19 attached to the rotor 11 is also rotated as one body with the rotor 11. With the fan 3 thus rotated, air in the exterior of the device is sucked in through an opening or openings provided in a casing constituting the computer; further, the air is circulated inside the casing and, while being circulated inside the heat sink provided in the casing, it is exhausted via a through-hole or through-holes to the exterior of the casing. As a result, heat generated from a heat generating element or elements is released to the exterior of the computer body, whereby the computer body is cooled.

Now, the bearing unit 30 used in the motor 1 will be described more in detail.

Figure 2:
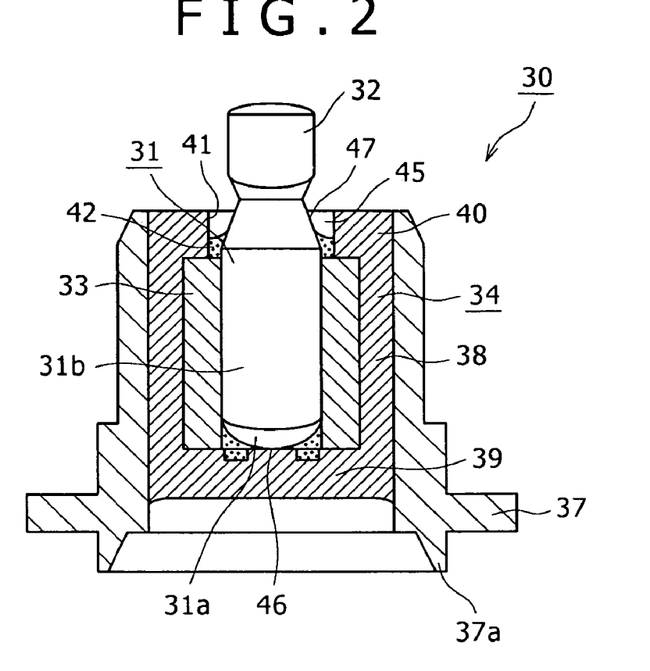
FIG. 2 is a sectional view of a bearing unit according one embodiment of the present invention.

As shown in FIGS. 1 and 2, the bearing unit 30 rotatably bearing the rotating shaft 31 of the motor 1 as above-mentioned includes a radial bearing 33 for bearing the rotating shaft 31 in the circumferential direction of the rotating shaft 31, a resin molded body 34 formed by molding on the outer periphery side of the radial bearing 33, and a housing 37 provided on the outside of the resin molded body 34.

The radial bearing 33 is formed in a cylindrical shape and formed of a sintered metal. The radial bearing 33 constitutes a dynamic pressure fluid bearing together with a lubricating oil 42 used as a viscous fluid for filling the resin molded body 34. The inner peripheral surface, along which the rotating shaft 31 is passed, of the radial bearing 33 is provided with dynamic pressure generating grooves 43, 44.

Figure 3:
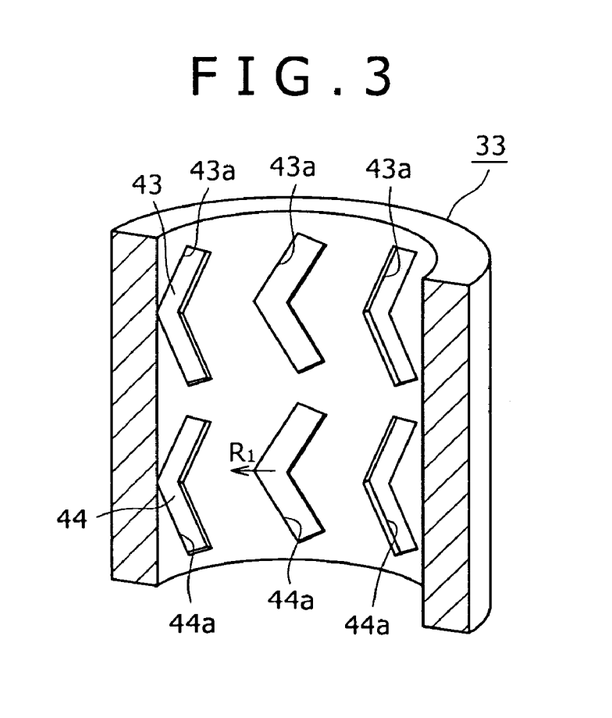
FIG. 3 is a perspective view showing a dynamic pressure generating groove formed at an inner peripheral surface of a radial bearing.

As shown in FIG. 3, the dynamic pressure generating grooves 43, 44 are configured by providing the inner peripheral surface of the radial bearing with a plurality of pairs of V-shaped grooves 43a, 44a along the circumferential direction. The dynamic pressure generating grooves 43, 44 are so formed that the tip end side of the pairs of V-shaped grooves 43a, 44a is directed in the rotating direction R1 of the rotating shaft 31. Here, the dynamic pressure generating grooves 43 and 44 are arranged as upper-lower pairs along the axial direction of the cylindrical radial bearing 33; specifically, the dynamic pressure generating grooves 43 are formed on the shaft exposing side on which the shaft is opened, and the dynamic pressure generating grooves 44 are formed on the shaft non-exposing side on which the shaft is not opened, i.e., on the thrust bearing side. The number and size of the dynamic pressure generating grooves 43, 44 are appropriately selected according to the size, length and the like of the radial bearing 33. Incidentally, the radial bearing 33 may be formed of brass, stainless steel or a polymeric material.

Incidentally, while the radial bearing 33 is formed here as a so-called dynamic pressure fluid bearing having dynamic pressure generating grooves, the radial bearing constituting the bearing unit pertaining to one embodiment of the present invention is not limited to this bearing, inasmuch as the bearing is for bearing the rotating shaft 31 in the circumferential direction of the rotating shaft 31. For example, a slide bearing, a sintered oil retaining bearing and the like may also be adopted.

In the radial bearing 33 formed as a dynamic pressure fluid bearing, when the rotating shaft 31 passed through the radial bearing 33 is continuously rotated in the direction of arrow R1 in FIG. 3 about the center axis CL, the lubricating oil 42 filling the inside of the resin molded body 34 is circulated in the dynamic pressure generating grooves 43, 44, to generate a dynamic pressure between the outer peripheral surface of the rotating shaft 31 and the inner peripheral surface of the radial bearing 33, thereby bearing the rotating shaft 31 in rotation. The dynamic pressure generated in this instance realizes smooth rotation of the rotating shaft 31.

As shown in FIG. 2, the resin molded body 34 formed on the outside of the radial bearing 33 is a molded resin body so shaped as to accommodate and surround the substantially cylindrical radial bearing 33, and is a single member formed by integral molding from a synthetic resin. The resin molded body 34 is formed when the radial bearing 33 and the metallic housing 37 are fastened by molding. Specifically, the resin molded body 34 molded on the metallic housing 37 by the so-called insert molding fastens integrally the housing 37 and the radial bearing 33 contained in the resin molded body 34.

As shown in FIG. 2, the resin molded body 34 includes a tubular resin molded body main body 38, a bottom closing part 39 constituting one end side part formed as one body with the resin molded body main body 38 so as to close one end side of the resin molded body main body 38, and a top closing part 40 formed as one body with the resin molded body main body 38 to constitute the other end side of the resin molded body main body 38. The top closing part 40 is provided in its central portion with a shaft passing hole 41 through which to pass the rotating shaft 31 rotatably borne by the radial bearing 33 contained in the resin molded body 34.

Specifically, the resin molded body 34 is formed on the outer peripheral side of the radial bearing 33 so as to sealingly contain the radial bearing 33, and is provided on one end side in the axial direction thereof with the shaft passing hole 41 through which to pass the rotating shaft 31. In other words, the resin molded body 34 is formed on the outer peripheral side of the radial bearing 33, and has a configuration in which the other parts than the shaft passing hole 41 for passing the rotating shaft 31 therethrough are sealed.

The resin molded body 34 is integrally provided at an inside central portion of the bottom surface part thereof with a thrust bearing 46 for rotatably bearing a bearing support part 31a provided at one end portion in the thrust direction of the rotating shaft 31 borne by the radial bearing 33. Specifically, the thrust bearing 46 is formed simultaneously with the molding of the resin molded body 34, and is used in common with the bottom closing part 39. The thrust bearing 46 is formed as a pivot bearing for bearing on a point basis the bearing support part 31a of the rotating shaft 31 which is formed in an arcuate shape or a tapered shape.

The resin molded body 34 configured as above is integrally formed in a configuration in which the radial bearing 33 is laid out on the inner peripheral side of the resin molded body main body 38 and the housing 37 is laid out on the outer peripheral side of the resin molded body main body 38, by insert molding of a synthetic resin material on the inside of the housing 37 in such a manner as to envelope the substantially cylindrical radial bearing 33.

The synthetic resin material constituting the resin molded body 34 is not particularly limited; desirably, use is made of such a material as to promise a large contact angle against the lubricating oil 42, i.e., repellency against the lubricating oil 42, used to fill the inside of the resin molded body 34. The resin molded body 34 is preferably formed by use of a synthetic resin material excellent in lubricating property. Examples of the synthetic resin for constituting the resin molded body 34 include fluorine-containing synthetic resins such as polyimide, polyamide, polyacetal, etc. and such synthetic resins as polytetrafluoroethylene: Teflon (registered trademark), nylon, etc. Further, such synthetic resins as PC (polycarbonate), ABS (acrylonitrile butadiene styrene), etc. Furthermore, the resin molded body 34 may be formed from a liquid crystal polymer capable of being molded with an extremely high accuracy. Particularly, where a liquid crystal polymer is used as the material for constituting the resin molded body 34, excellent property of retaining the lubricating oil and excellent abrasion resistance are obtained.

The housing 37 is formed of a metal such as brass, and is fastened to the radial bearing 33 by the above-mentioned resin molded body 34, thereby being integrated with the radial bearing 33. Here, the metallic material constituting the housing 37 is not limited to brass. In addition, the housing 37 is provided with a caulking part 37a as an attaching section for attaching the bearing unit 30 to an object, for example, the stator 12 of the motor 1.

As shown in FIG. 1, the bearing unit 30 is attached to the stator yoke 13 of the stator 12, used here as the object to which the bearing unit 30 is to be attached, by caulking the caulking part 37a of the metallic housing 37. This makes it possible to enhance also reliability such as mechanical strength, and to attach the bearing unit 30 to the object easily and assuredly.

Figure 4A:
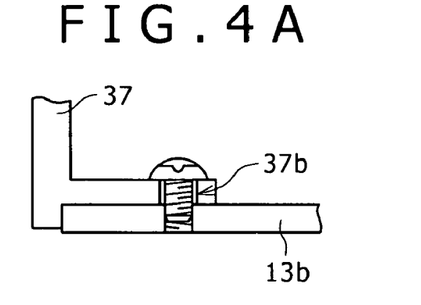
FIG. 4A is a sectional view of an attaching section including a screw part.
Figure 4B:
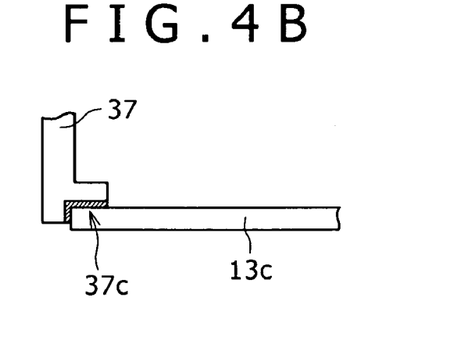
FIG. 4B is a sectional view of an attaching section including an adhesion part.
Figure 4C:
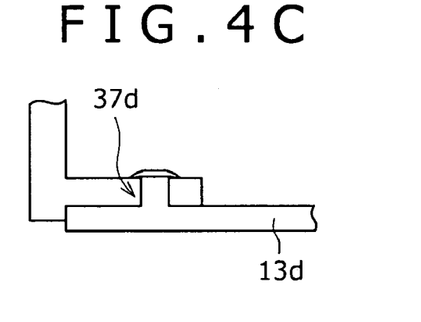
FIG. 4C is a sectional view of an attaching section including a heat caulking part or a fusing part.

Incidentally, while the caulking part 37a is provided here as the attaching section provided in the housing 37, the attaching section is not limited to the caulking part 37a. There may also be adopted an attaching, section composed of a screw part 37b for screw-fastening to an object 13b as shown in FIG. 4A, an attaching section composed of an adhesion part 37c formed, for example, in a flange-like shape for adhesion to an object 13c as shown in FIG. 4B, or an attaching section composed of a heat caulking part 37d for heat-caulking to a resin-made object 13d or a fusing part for fusing as shown in FIG. 4C.

The rotating shaft 31 rotatably borne by the radial bearing 33 disposed in the resin molded body 34 and the thrust bearing 46 provided as one body with the resin molded body 34 has a configuration in which the bearing support part 31a, borne by the thrust bearing 46, of a shaft body 31b is formed in an arcuate shape or a tapered shape, and an attaching part 32 to which a rotating body, for example, the rotor 11 of the motor 1 is to be attached is provided on the other end side of the rotating shaft 31.

As shown in FIG. 2, of the rotating body 31, the bearing support part 31a on one end side is borne by the thrust bearing 46, the outer peripheral surface of the shaft body 31b is borne by the radial bearing 33, and the side of the attaching part 31 provided on the other end side is projected via the shaft passing hole 41 provided in the top closing part 40 of the resin molded body main body 38 and is borne by the resin molded body 34 formed as one body with the housing 37.

Meanwhile, the shaft passing hole 41 is formed to have an inside diameter slightly larger than the outside diameter of the shaft body 31b so that the rotating shaft 31 passed through the shaft passing hole 41 is rotated without making frictional contact with the inner peripheral surface of the shaft passing hole 41. In this case, the shaft passing hole 41 is so formed that a gap 45 with a spacing c sufficient for preventing the lubricating oil 42 filling the inside of the resin molded body 34 from leaking from the inside of the resin molded body 34 is formed between the inner peripheral surface of the shaft passing hole 41 and the outer peripheral surface of the shaft body 31b. The top closing part 40 thus provided with the shaft passing hole 41 so that the gap 45 for preventing the leakage of the lubricating oil 42 filling the inside of the resin molded body 34 is formed between the shaft passing hole 41 and the rotating shaft 31 constitutes an oil seal part.

The outer peripheral surface, facing the inner peripheral surface of the shaft passing hole 41, of the rotating shaft 31 is provided with a tapered part 47. The tapered part 47 is so inclined as to enlarge, toward the outside of the resin molded body 34, the gap 45 formed between the outer peripheral surface of the rotating shaft 31 and the inner peripheral surface of the shaft passing hole 41. The tapered part 47 produces a pressure gradient in the gap 45 formed between the outer peripheral surface of the rotating shaft 31 and the inner peripheral surface of the shaft passing hole 41, leading to the generation of a force for pulling the lubricating oil 42 filling the inside of the resin molded body 34 into the inside of the resin molded body 34. At the time of rotation of the rotating shaft 31, the lubricating oil 42 is pulled into the inside of the resin molded body 34, so that the lubricating oil 42 enters assuredly into the dynamic pressure generating grooves 43 and 44 of the radial bearing 33 composed of a dynamic pressure fluid bearing, to generate a dynamic pressure, whereby stable bearing of the rotating shaft 31 is realized, and, at the same time, leakage of the lubricating oil 42 placed to fill the inside of the resin molded body 34 can be prevented.

Figure 5:
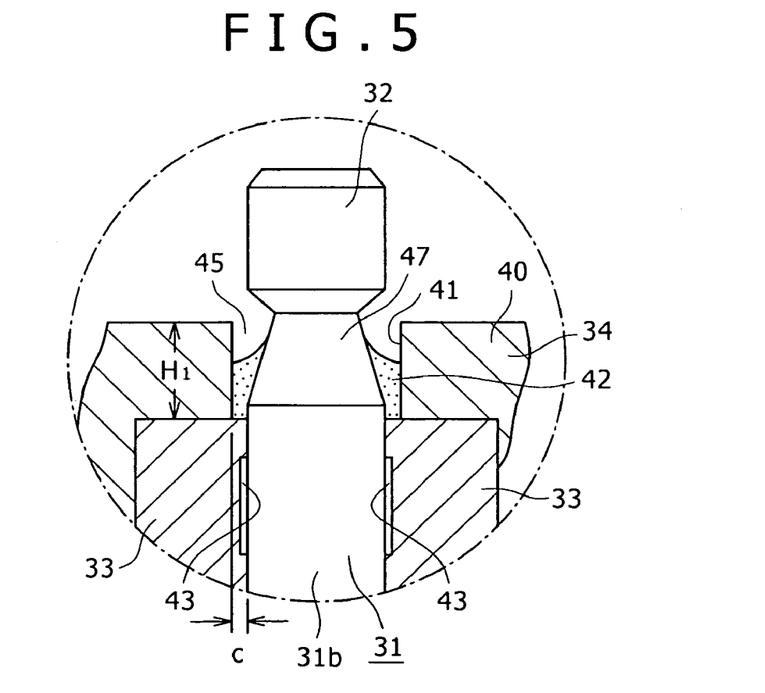
FIG. 5 is a sectional view of a gap formed between an outer peripheral surface of a rotating shaft and an inner peripheral surface of a shaft passing hole provided in the housing.

In the bearing unit 30 according to one embodiment of the present invention, as shown in FIGS. 2 and 5, the lubricating oil 42 generating the dynamic pressure by entering into the dynamic pressure generating grooves 43 and 44 provided in the radial bearing 33 constituting the dynamic pressure fluid bearing is placed to fill the inside of the resin molded body 34 and to front on the gap 45 formed between the tapered part 47 of the rotating shaft 31 and the inner peripheral surface of the shaft passing hole 41. Specifically, the lubricating oil 42 fills the cavities inside the resin molded body 34, and, further, impregnates therewith the radial bearing 33 formed of a sintered metal.

The bearing unit 30 has a configuration in which the scattering of the lubricating oil 42 can be prevented by a surface tension seal through adjusting the spacing c of the gap 45 and the height H1 of the shaft passing hole 41, and the force for pulling the lubricating oil 42 into the inside of the resin molded body 34 can be generated by generating the pressure gradient in the lubricating oil 42 located in the gap 45 through providing the tapered part 47, whereby engulfing of air into the lubricating oil 42 can be prevented, leakage of the lubricating oil 42 can be prevented, and, further, stable rotation of the rotating shaft 31 can be ensured. While the above-described bearing unit 30 has the tapered part 47 on the rotating shaft 31 side, the inner peripheral surface of the shaft passing hole 41 on the molded resin body 34 side may be provided with a tapered part.

A process of manufacturing the bearing unit 30 according to one embodiment of the present invention, configured as above, will be described below.

Figure 6:
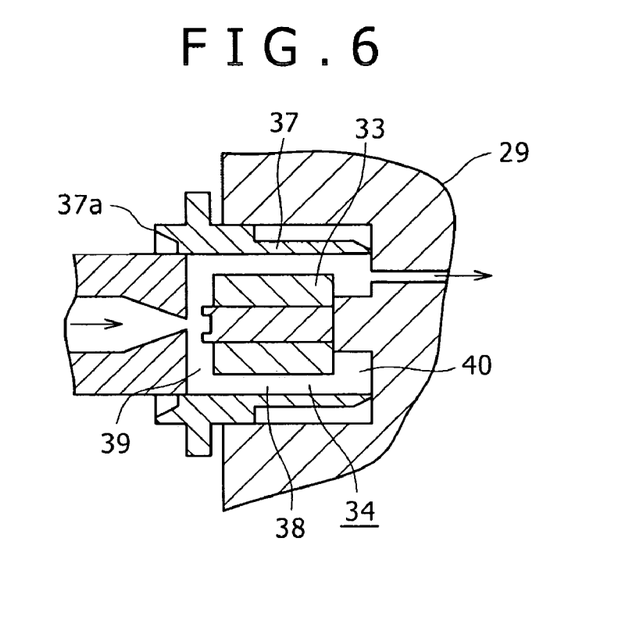
FIG. 6 illustrates a manufacturing process of the bearing unit according to one embodiment of the invention.

In order to manufacture the bearing unit 30, as shown in FIG. 6, the radial bearing 33 and the metallic housing 37 are attached to a molding die 29, and any of the above-mentioned synthetic resins is insert molded on the inside of the metallic housing 37, to form the resin molded body 34. In this case, the resin molded body 34 is formed to surround the outer periphery of the radial bearing 33 and is formed on the inside of the housing 37, thereby integratingly fastening the radial bearing 33 and the housing 37. In addition, in this case, the radial bearing 33 is clamped between the top closing part 40 and the bottom closing part 39 formed on the upper and lower sides as one body with the tubular resin molded body main body 38, whereby the attaching position thereof is fixed. Besides, in this case, the bottom closing part 39 is integrally provided with the thrust bearing 46.

Next, the rotating shaft 31 is inserted into the housing 37 by passing it through the shaft passing hole 41 provided in the top closing part 40. In this instance, the rotating shaft 31 is inserted into the resin molded body 34 by passing it through the radial bearing 33, with the bearing support part 31a in abutment on the thrust bearing 46. The rotating shaft 31 borne by the thrust bearing 46 and the radial bearing 33 is rotatably supported inside the resin molded body 34 formed as one body with the housing 37.

When the rotating shaft 31 is just inserted in the resin molded body 34, the lubricating oil 42 is placed to fill the inside of the resin molded body 34. The filling with the lubricating oil 42 is conducted by throwing the resin molded body 34 integrated with the housing 37, in which the rotating shaft 31 is inserted, into a filling tank containing the lubricating oil. Next, the filling tank with the housing 37 put therein is evacuated by an evacuating device. Thereafter, the evacuated filling tank is taken out into the atmosphere, whereby the inside of the resin molded body 34 is filled up with the lubricating oil 42.

In this case, the filling with the lubricating oil is so conducted that leakage of the lubricating oil 42 through the shaft passing hole 41 to the exterior of the resin molded body 34 is prevented from occurring when the lubricating oil 42 is expanded due to a temperature variation, and that insufficient filling of the gap 45 formed between the rotating shaft 31 and the shaft passing hole 41 is prevented from being generated when the lubricating oil 42 is contracted due to a temperature variation. In other words, a setting is made such that the variations in the oil level of the lubricating oil 42 due to temperature variations are within the range of the inside of the shaft passing hole 41.

The filling of the resin molded body 34 with the lubricating oil 42 is performed by evacuation using an evacuating device, whereby the pressure in the inside of the resin molded body 34 becomes lower than the pressure in the outside. As a result, the lubricating oil 42 is prevented from easily leaking out of the resin molded body 34.

Since in the bearing unit 30 as above-described the radial bearing 33 is formed of a sintered metal, the radial bearing 33 is filled (impregnated) with the lubricating oil 42, and, further, the dynamic pressure generating grooves 43 and 44 for generating a dynamic pressure by rotation of the rotating shaft 31 are also filled with the lubricating oil 42. Namely, all the cavities inside the housing 37 are filled with the lubricating oil 42.

In the bearing unit 30 configured as above, the metallic housing 37 and the radial bearing 33 are integrally fastened by the resin molded body 34, and the caulking part 37a as the attaching section provided in the housing 37 is caulked to thereby attach the bearing unit 30 to an object, whereby reliability such as mechanical strength can be enhanced, and the bearing unit 30 can be attached to the object easily and assuredly.

In addition, in the bearing unit 30, the other parts than the metallic housing 37 are formed from a resin material; specifically, the member containing the radial bearing 33 and the thrust bearing 46 therein and filled with the lubricating oil 42 is composed of the resin molded body 34 formed by molding. This makes it possible to prevent leakage of the lubricating oil, and to obtain a good lubrication performance.

Specifically, in the bearing unit 30, the rotating shaft 31 is exposed only at one end on the shaft passing hole 41 side, and the other parts than the slight gap at the shaft passing hole 41 are seamlessly covered with the resin molded body 34. Therefore, it is possible to prevent the leakage due to oozing-out of the lubricating oil through a joint part in the case where the members to be filled with the lubricating oil are joined to each other, and to prevent the lubricating oil from being scattered due to shock.

Therefore, in the bearing unit 30 according to one embodiment of the present invention, the radial bearing 33 for bearing the rotating shaft 31 in the circumferential direction of the rotating shaft 31 and the metallic housing 37 provided with the attaching section are fastened together by molding, the resin molded body 34 formed by the molding is so formed as to sealingly contain the radial bearing 33 therein, the resin molded body 34 is provided on one end side in the axial direction with the shaft passing hole 41 through which to pass the rotating shaft 31, and the inside of the resin molded body 34 is filled with the lubricating oil 42, whereby leakage of the lubricating oil 42 can be prevented, the bearing unit 30 can be attached to an object easily and assuredly. In addition, the prevention of leakage of the lubricating oil 42 makes it possible to maintain a good lubrication performance for a long period of time.

Incidentally, while the thrust bearing 46 in the above-described bearing unit 30 is formed as a part of the resin molded body 34, a configuration may be adopted in which the thrust bearing is formed independently of the resin molded body and is disposed on a bottom closing part of the resin molded body.

Figure 7:
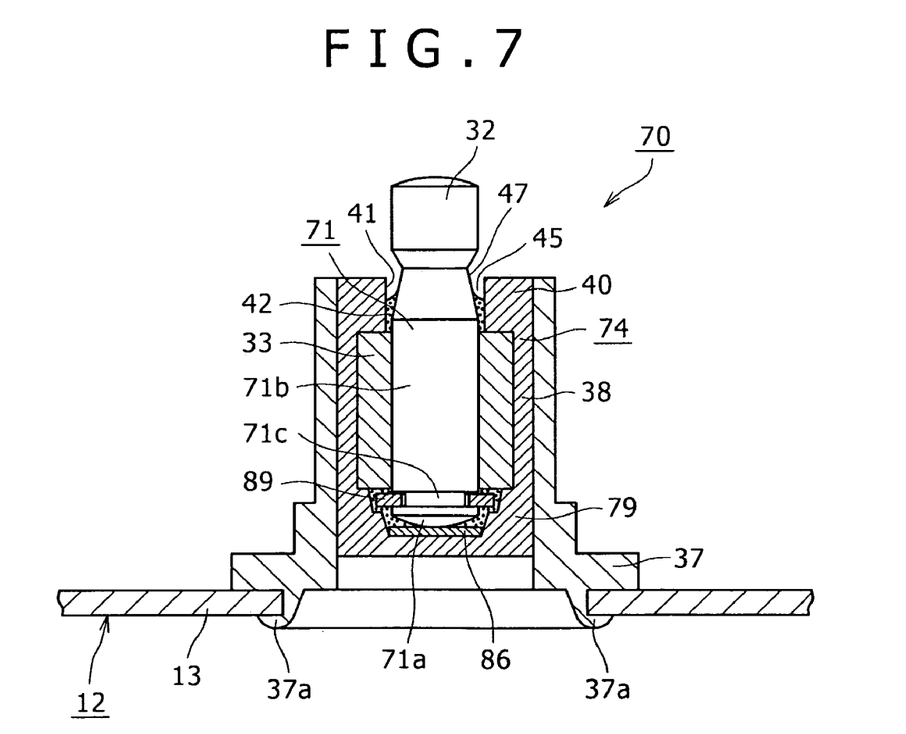
FIG. 7 is a sectional view showing another example of the bearing unit according to one embodiment of the invention.

The bearing unit in which the thrust bearing is provided independently from the resin molded body may be configured as shown in FIG. 7, for example. Incidentally, in the following description, the same parts as those in the bearing unit 30 shown in FIG. 2 above will be denoted by the same symbols as used above, and detailed descriptions of the parts will be omitted.

The bearing unit 70 shown in FIG. 7 includes a radial bearing 33 for bearing a rotating shaft 71 in the circumferential direction of the rotating shaft 71, a resin molded body 74 formed on the outer peripheral side of the radial bearing 33 by molding, and a housing 37 provided on the outside of the resin molded body 74.

As shown in FIG. 7, the resin molded body 74 formed on the outside of the radial bearing 33 is a molded resin body so shaped as to contain and surround the substantially cylindrical radial bearing 33, and is a single member formed by integrally molding a synthetic resin. The resin molded body 74 is formed at the time of fastening the radial bearing 33 and the metallic housing 37 together by molding. Specifically, the resin molded body 74 molded in the metallic housing 37 by the so-called insert molding integrally fastens the housing 37 with a thrust bearing 86 and the radial bearing 33 which are contained in the resin molded body 74.

As shown in FIG. 7, the resin molded body 74 includes a tubular resin molded body main body 38, a bottom closing part 79 constituting a one end side part formed as one body with the resin molded body main body 38 so as to close one end side of the resin molded body main body 38, and a top closing part 40 constituting the other end side of the resin molded body main body 38 and formed as one body with the resin molded body main body 38. The top closing part 40 is provided in its central portion with a shaft passing hole 41 through which to pass a rotating shaft 71 rotatably borne by the radial bearing 33 contained in the resin molded body 74.

To be more specific, the resin molded body 74 is formed on the outer peripheral side of the radial bearing 33 so as to sealingly contain the radial bearing 33 and a thrust bearing 86, and has the shaft passing hole 41 on one end side in the axial direction.

A bottom part of the resin molded body 74 is provide on the inner surface side thereof with the thrust bearing 86 for rotatably bearing a bearing support part 71a provided at one end portion in the thrust direction of the rotating shaft 71 borne by the radial bearing 33. The thrust bearing 86 is formed as a pivot bearing for bearing on a point basis the bearing support part 71a of the rotating shaft 71 which is formed in an arcuate shape or a tapered shape.

In the resin molded body 74 configured as above, a synthetic resin material is insert molded on the inside of the housing 37 so as to envelope the substantially tubular radial bearing 33, whereby the radial bearing 33 is disposed on the inner peripheral side of the resin molded body main body 38, while the housing 37 is disposed on the outer peripheral side of the resin molded body main body 38, and they are formed to be integral.

As the synthetic resin material constituting the resin molded body 74, the same materials as those for the resin molded body 34 above-described may be used.

The housing 37 of the bearing unit 70 is formed of a metal such as brass, as above-mentioned, and is fastened to the radial bearing 33 by the resin molded body 74 so as to be integrated with the radial bearing 33 and the thrust bearing 86. Here, the metallic material constituting the housing 37 is not limited to brass. In addition, the housing 37 is provided with a caulking part 37a as an attaching section, as above-mentioned. Incidentally, FIG. 7 shows the condition where the caulking part 37a of the housing 37 has been caulked onto a stator yoke 13.

The bearing unit 70 is attached to the stator yoke 13 of the stator 12, which is the object, by caulking the caulking part 37a of the metallic housing 37, which makes it possible to enhance reliability such as mechanical strength and to attach the bearing unit 70 to the object easily and assuredly.

The rotating shaft 71 rotatably borne by the radial bearing 33 disposed inside the resin molded body 74 and the thrust bearing 86 disposed on the bottom closing part 79 of the resin molded body 74 has a configuration in which the bearing support part 71a rotatably borne by the thrust bearing 86 is formed in an arcuate shape or a tapered shape, and an attaching part 32 to which a rotating body, for example, a rotor 11 of a motor 1 is to be attached is provided on the other end side. Here, the shaft body 71b and the attaching member 32 are formed to be equal in diameter.

As shown in FIG. 7, of the rotating shaft 71, the bearing support part 71a on one end side is borne by the thrust bearing 86, the outer peripheral surface of a shaft part body 71b is borne by the radial bearing 33, and the attaching part 32 provided on the other end side is projected out through the shaft passing hole 41 provided in the top closing part 40 of the resin molded body main body 38, whereby the rotating shaft 71 is borne by the resin molded body 74 integral with the housing 37.

In addition, the rotating shaft 71 is provided with a groove part 71c for preventing shaft slip-off, between the bearing support part 71a and the shaft part body 71b. The resin molded body 74 is provided with a washer 89 as a shaft slip-off preventive section, correspondingly to the shaft slip-off preventive groove part 71c. By engagement of the shaft slip-off preventive shaft part 71c with the washer 89, property for handling at the time of assembly is enhanced. The washer 89 is formed of a polymeric material such as nylon, polyamide, polyimide, etc. or a metal such as stainless steel, phosphor bronze, etc.

In the bearing unit 70 according this embodiment of the present invention, the lubricating oil 42 for generating a dynamic pressure by entering into the dynamic pressure generating grooves 43, 44 provided in the radial bearing 33 constituting the dynamic pressure fluid bearing is placed so as to fill up the inside of the resin molded body 74 and to front on the gap 45 defined by the tapered part 47 of the rotating shaft 71 and the inner peripheral surface of the shaft passing hole 41, as shown in FIG. 7. In other words, the lubricating oil 42 is placed to fill up the cavities in the resin molded body 74 and, further, to impregnate therewith the radial bearing 33 composed of a sintered metal.

Like the bearing unit 30 described above, the bearing unit 70 is advantageous in that scattering of the lubricating oil 42 can be prevented by regulating the spacing c of the gap 45 and the height H1 of the shaft passing hole 41, a force for pulling the lubricating oil 42 into the inside of the resin molded body 74 can be generated by providing the tapered part 47, air can be prevented from being engulfed in the lubricating oil 42, leakage of the lubricating oil 42 can be prevented, and, further, stable rotation of the rotating shaft 71 can be ensured.

The bearing unit 70 configured as above, in which the metallic housing 37 and the radial bearing 33 are integrally fastened together by the resin molded body 74, is attached to an object by caulking the caulking part 37a provided in the housing 37 as an attaching section, whereby reliability such as mechanical strength can be enhanced, and the bearing unit 70 can be attached to the object easily and assuredly.

In addition, of the bearing unit 70, the other parts than the metallic housing 37 are formed of a resin material, i.e., the member for containing the radial bearing 33 and the thrust bearing 86 therein and for being filled with the lubricating oil 42 is composed of the resin molded body 74 formed by molding, whereby leakage of the lubricating oil can be prevented, and a good lubrication performance can be obtained.

Specifically, in the bearing unit 70, the rotating shaft 71 is exposed only at one end on the shaft passing hole 41 side, and the other part than the slight gap at the shaft passing hole 41 is seamlessly covered with the resin molded body 74, whereby it is possible to eliminate the possibility of leakage due, for example, of oozing-out of the lubricating oil through a joint part in the case where members to be filled with the lubricating oil are joined to each other, and it is possible to prevent the lubricating oil from being scattered due to shock.

Therefore, the bearing unit 70 according to this embodiment of the present invention has a configuration in which the radial bearing 33 for bearing the rotating shaft 71 in the circumferential direction of the rotating shaft 71 and the metallic housing 37 provided with the attaching sections are fastened together by molding, the resin molded body 74 formed by the molding is formed to sealingly contain the radial bearing 33 and provided on one end side in the axial direction thereof with the shaft passing hole 41 through which to pass the rotating shaft 71, and the inside of the resin molded body 74 is filled with the lubricating oil 42. This ensures that leakage of the lubricating oil 42 can be prevented, and the bearing unit 70 can be attached to an object easily and assuredly. In addition, since leakage of the lubricating oil 42 can be prevented, a good lubrication performance can be maintained for a long time.

Figure 8:
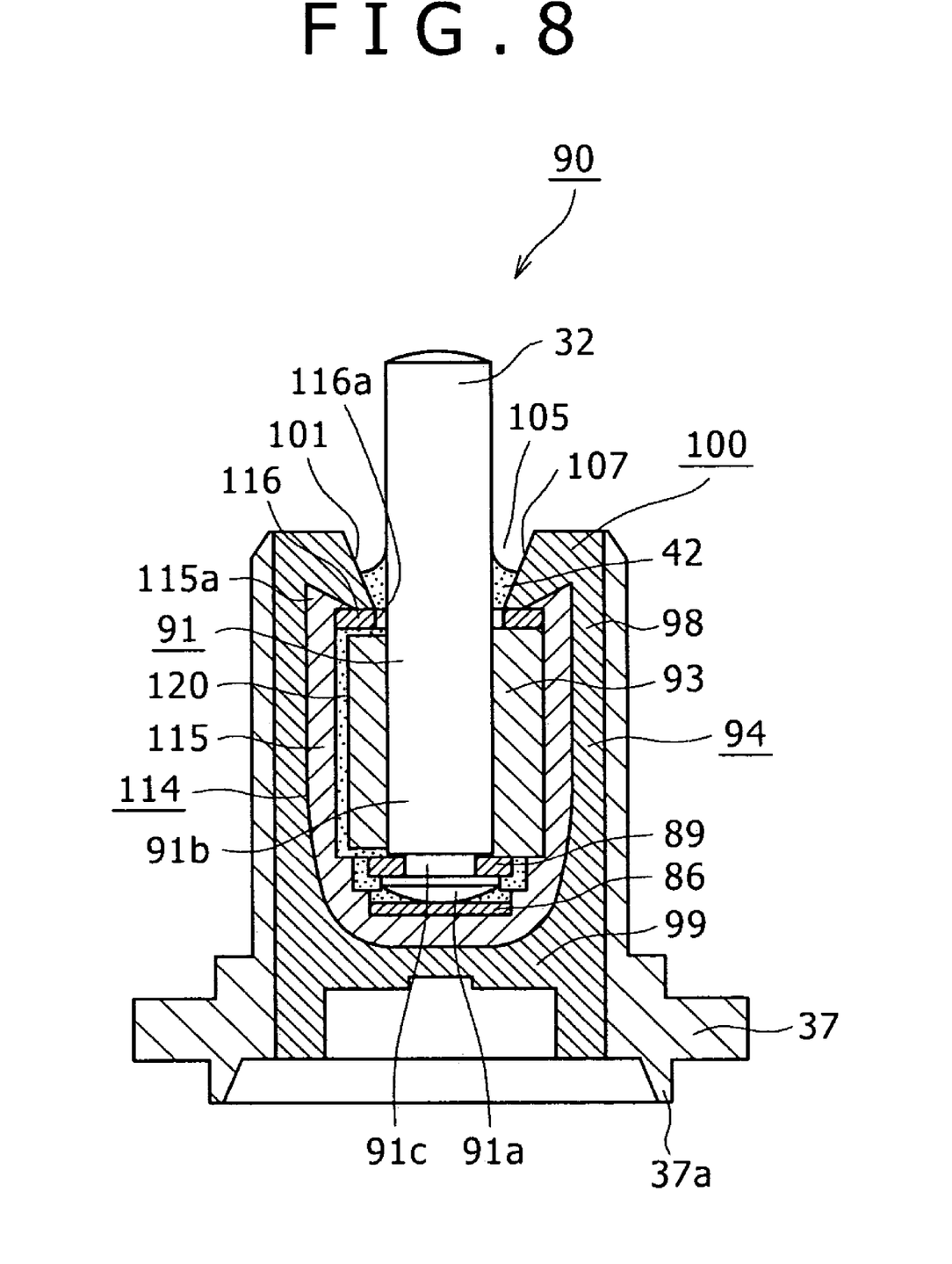
FIG. 8 is a sectional view showing an example, in which a passage forming member is provided, of the bearing unit according to one embodiment of the invention.

Besides, the bearing unit in the present invention is not limited to the above-described bearing units 30, 70. For example, as shown in FIG. 8, a configuration may be adopted in which a communicating passage is provided for communication between the one end side in the thrust direction of the rotating shaft protruding from the radial bearing and the other end side. Incidentally, in the following description, the same parts as those in the bearing units 30 and 70 shown in FIGS. 2 and 7 above will be denoted by the same reference symbols as used above, and detailed descriptions of the parts will be omitted.

The bearing unit 90 shown in FIG. 8 includes a radial bearing 93 for bearing a rotating shaft 91 in the circumferential direction of the rotating shaft 91, a passage forming member 114 formed on the outer peripheral side of the radial bearing 93, a resin molded body 94 formed on the outside of the passage forming member 114 by molding, a housing 37 provided on the outside of the resin molded body 94, and a communicating passage 120 formed between the passage forming member 114 and the radial bearing 93.

Like the radial bearing 33 described referring to FIG. 3 above, the radial bearing 93 of the bearing unit 90 is formed in a tubular shape from a sintered metal, and constitutes a dynamic pressure fluid bearing together with the lubricating oil 42. The inner peripheral surface along which the rotating shaft 91 is passed is provided with dynamic pressure generating grooves 43, 44.

Incidentally, while the radial bearing 93 is formed here as a so-called dynamic pressure fluid bearing having the dynamic pressure generating grooves, the radial bearing constituting the bearing unit according to this embodiment of the present invention is not limited to this one, inasmuch as the radial bearing bears the rotating shaft in the circumferential direction of the latter. For example, a slide bearing, a sintered oil retaining bearing, etc. may also be adopted.

The passage forming member 114 provided on the outside of the radial bearing 93 has such a shape as to contain and surround the radial bearing 93 formed in a tubular shape, as shown in FIG. 8, and is formed from a synthetic resin, for example.

As shown in FIG. 8, the passage forming member 114 includes a passage forming member main body 115 so formed as to surround a side surface portion and a bottom portion of the radial bearing 93, and a passage forming member lid part 116 so formed as to surround a top portion of the radial bearing 93. The passage forming member lid part 116 is provided in its central portion with a shaft passing hole 116a through which to pass the rotating shaft 91 rotatably borne by the radial bearing 93.

The bottom portion of the passage forming member main body 115 is provided on the inner surface side with a thrust bearing 86 for rotatably bearing the bearing support part 91a provided at one end portion in the thrust direction of the rotating shaft 91 borne by the radial bearing 93. The thrust bearing 86 is formed as a pivot bearing for bearing on a point basis the bearing support part 91a of the rotating shaft 91 which is formed in an arcuate shape or a tapered shape.

The passage forming member main body 115 is provided on the circumference of an upper portion thereof with a pawl-like restricting part 115a for fixing the passage forming member lid part 116 in such a manner as to cover a top portion of the radial bearing 93.

Incidentally, while the passage forming member 114 has been described to be formed from a resin, it may be made of a metal, or may be formed of a combination of resin and metal; thus, the material constituting the passage forming member 114 is not limited. Where the passage forming member 114 is formed of a resin, there can be obtained the merits that it is possible to make a contrivance in regard of shape, such as phase index in relation to the radial bearing, and to obtain the passage forming member 114 inexpensively. Examples of the resin material used for constituting the passage forming member 114 include such fluorine-containing synthetic resins as polyimide, polyamide, polyacetal, etc., such synthetic resins as tetrafluoroethylene: Teflon (registered trademark), nylon, etc., and such synthetic resins as PC (polycarbonate), ABS (acrylonitrile butadiene styrene), etc.

A communicating passage 120 is formed between the passage forming member 114 and the radial bearing 93. The communicating passage 120 establishes communication between one end portion in the thrust direction of the rotating shaft 91 protruding from the radial bearing 93 and the other end portion. Namely, the communicating passage 120 establishes communication between the one end side on which the thrust bearing 86 is formed and the other end portion on the side of the shaft passing hole 116a in the passage forming member lid part 116.

Figure 9:
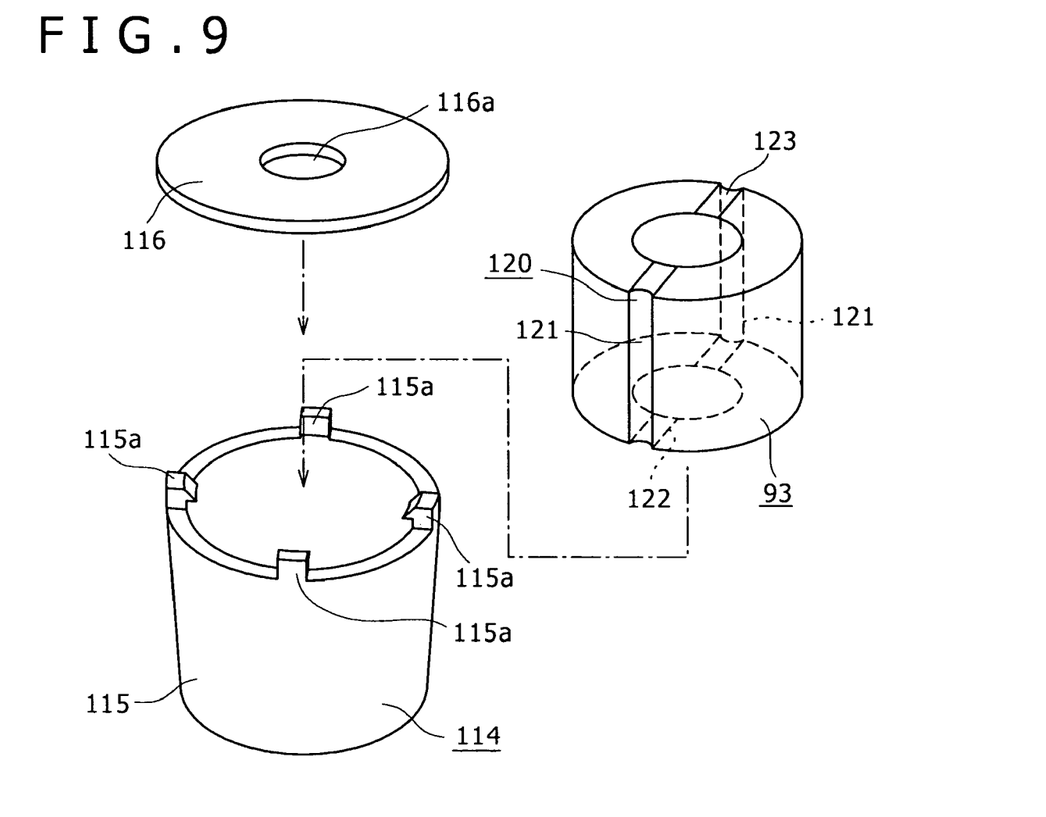
FIG. 9 is a perspective view showing the shape of a communicating passage formed between the passage forming member and the radial bearing.
Figure 10:
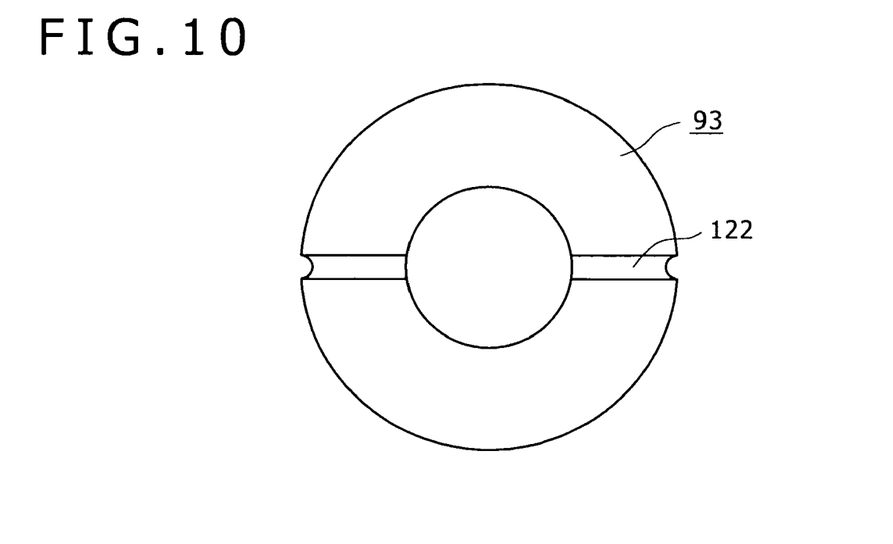
FIG. 10 is a bottom view showing a second groove to be the communicating passage formed in a bottom surface portion of the radial bearing.

As shown in FIGS. 9 and 10, the communicating passage 120 is composed of first grooves 121 formed in the outer peripheral surface of the radial bearing 93 in the thrust direction, a second groove 122 formed in one end face on the thrust bearing 86 side of the radial bearing 93, and a third groove 123 formed in the other end face of the radial bearing 93.

Figure 11:
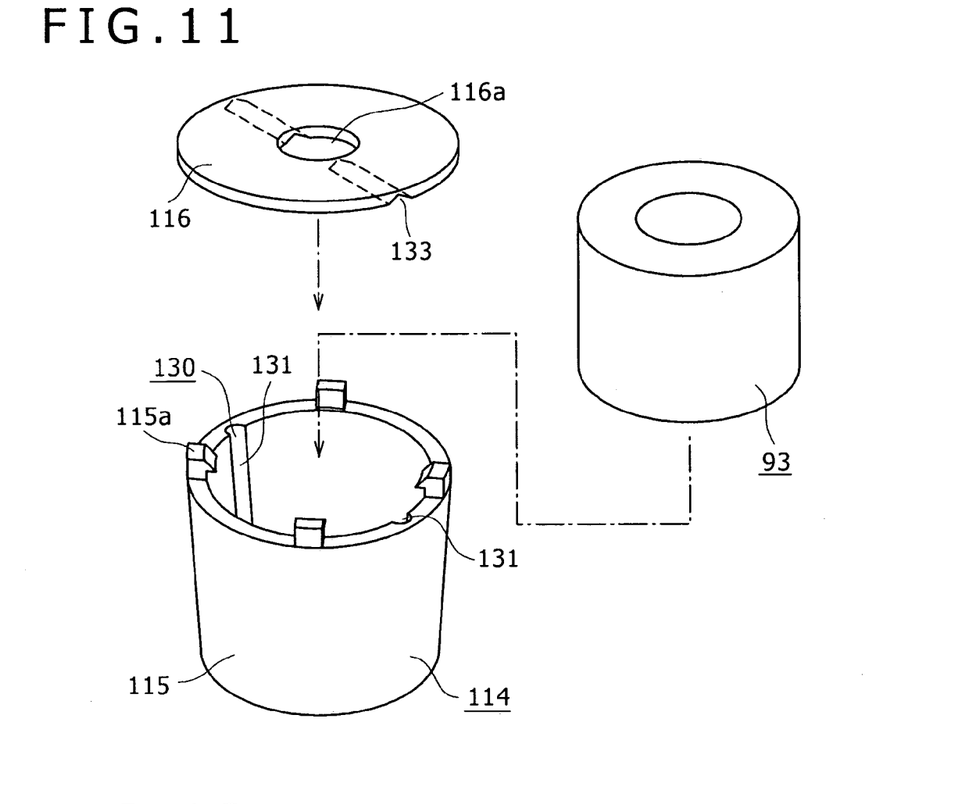
FIG. 11 is a perspective view showing another shape of the communicating passage formed between the passage forming member and the radial bearing.
Figure 12:
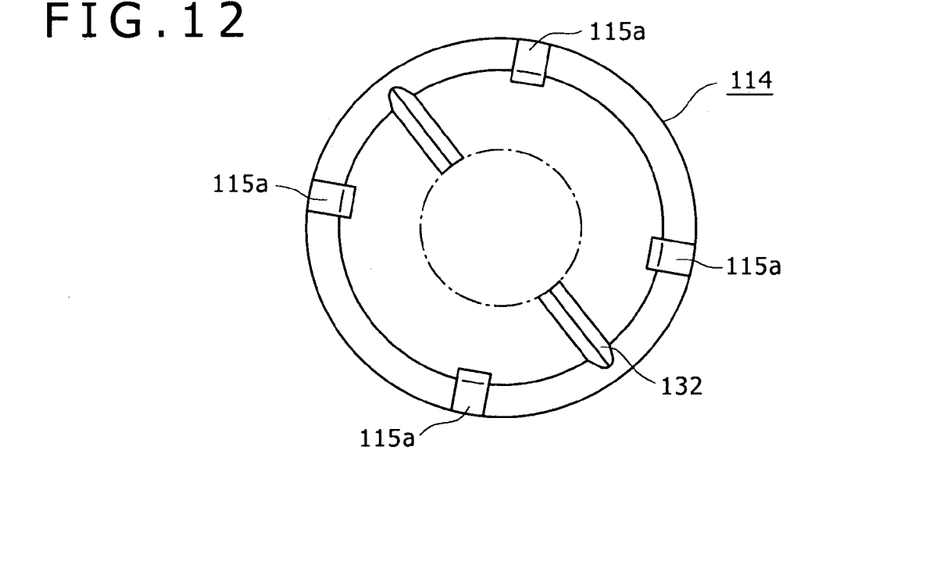
FIG. 12 is a plan view showing a second groove to be the communicating passage formed on the bottom surface side of the passage forming member.

Incidentally, the communicating passage may be provided on the passage forming member 114 side, as shown in FIGS. 11 and 12. Specifically, the communicating passage 130 provided on the passage forming member 114 side may be composed of first grooves 131 formed in the inner peripheral surface of the passage forming member main body 115 of the passage forming member 114 along the thrust direction, a second groove 132 formed in the inner surface of a bottom portion of the passage forming member main body 115, and a third groove 133 formed in the inner surface of the passage forming member lid part 116. Furthermore, there can be adopted a combination of the first to third grooves 121 to 123 provided on the radial bearing side with the first to third grooves 131 to 133 provided in the passage forming member 114.

In the communicating passage 120 or the communicating passage 130, the released side and the non-released side of the rotating shaft 91 protruding from the radial bearing 93 communicate with each other, so that even when the rotating shaft 91 and the resin molded body 94 are rotated relative to each other and a dynamic pressure is thereby generated, the static pressure at the shaft end on the shaft non-exposed side on which the rotating shaft 91 is non-released can be prevented from being lowered. Therefore, the communicating passage 120 or the communicating passage 130 can prevent the lubricating oil from being pushed out due to the expansion of residual air in the resin molded body 94 or of air dissolved in the lubricating oil which might be generated due to a lowering in the static pressure inside the communicating passage. Besides, in other words, the communicating passage 120 or 130 can short-circuit the pressures at both ends of the dynamic pressure generating grooves 43, 44 provided in the bearing shaft 93, so that generation of a pressure difference can be prevented, and the shaft floating due to such a pressure difference can be prevented from occurring.

As shown in FIG. 8, the resin molded body 94 containing the passage forming member 114 therein is a molded resin member having such a shape as to contain and surround the substantially cylindrical passage forming member 114, and is a single member integrally formed by molding a synthetic resin. The resin molded body 94 is formed at the time when the passage forming member 114 containing the radial bearing 93 therein and the metallic housing 37 are fastened together by molding. Specifically, the resin molded body 94 molded in the metallic housing 37 by so-called insert molding fastens integrally the housing 37 with the thrust bearing 86, the radial bearing 93 and the passage forming member 114 which are contained in the resin molded body 94.

As shown in FIG. 8, the resin molded body 94 is composed of a tubular resin molded body main body 98, a bottom closing part 99 constituting a one end side part formed as one body with the resin molded body main body 98 so as to close one end side of the resin molded body main body 98, and a top closing part 100 formed as one body with the resin molded body main body 98 and constituting the other end side of the resin molded body main body 98. The top closing part 100 is provided in its central portion with a shaft passing hole 101 through which to pass the rotating shaft 91 rotatably borne by the radial bearing 93 contained in the resin molded body 94.

Specifically, the resin molded body 94 is formed on the outer peripheral side of the radial bearing 93 and the passage forming member 114 so as to sealingly contain the radial bearing 93, the thrust bearing 86 and the passage forming member 114 therein, and is provided on one end side thereof in the axial direction with the shaft passing hole 101 through which to pass the rotating shaft 91.

The resin molded body 94 configured as above is integrally formed so that the thrust bearing 86, the radial bearing 93 and the passage forming member 114 are disposed on the inner peripheral side of the resin molded body main body 98 and that the housing 37 is disposed on the outer peripheral side of the resin molded body main body 98, by insert molding a synthetic resin material on the inside of the housing 37 so as to envelope the passage forming member 114 containing the radial bearing 93 and the thrust bearing 86 therein.

As the synthetic resin material for constituting the resin molded body 94, the same materials as those for constituting the above-described resin molded body 34 may be used.

The housing 37 of the bearing unit 90 is formed of a metal such as brass, as above-mentioned, and is fastened to the passage forming member 114 by the resin molded body 94 to be thereby integrated with the thrust bearing 86, the radial bearing 93 and the passage forming member 114. Here, the metallic material constituting the housing 37 is not limited to brass. Besides, the housing 37 is provided with a caulking part as an attaching section, as above-described.

The bearing unit 90 is attached to a stator yoke 13 of a stator 12 serving as an object by caulking the caulking part 37a of the metallic housing 37, so that it is possible to enhance reliability such as mechanical strength, and to fasten and attach the bearing unit 90 to the object easily and assuredly.

Meanwhile, the bearing unit 90 is of the so-called both shaft end released type in which both ends of the rotating shaft 91 protruding from the radial bearing 93 are made to communicate with each other by providing the communicating passage 120. A both shaft end released type bearing unit in the past has had the problem that a lubricating oil is liable to be scattered due to shocks. In the present bearing unit 90, a seamless structure is adopted in which both the radial bearing 93 and the passage forming member 114 exclusive of the shaft passing hole 101 are sealed with the resin molded body 94. Therefore, though the shaft released side and the shaft non-released side of the rotating shaft 91 protruding from the radial bearing 93 are made to communicate with each other through the communicating passage 120, the other parts than the shaft passing hole 101 provided in the resin molded body 94 are sealed from the exterior. Namely, in this bearing unit 90, the communicating passage 120 is formed in the resin molded body 94 formed seamlessly and sealed from the exterior, so that scattering of the lubricating due to shocks can be prevented.

The rotating shaft 91, rotatably borne by the radial bearing 93 disposed in the passage forming member 114 in the resin molded body 94 and the thrust bearing 86 disposed on the bottom closing part of the passage forming member 114, has a configuration in which the bearing support part 91a rotatably borne by the thrust bearing 86 is formed in an arcuate shape or a tapered shape, and an attaching part 32 to which to attach a rotating body, for example, a rotor 11 of a motor 1 is provided on the other end side. Here, a shaft body 91b and the attaching part 32 are formed to be equal in diameter.

As shown in FIG. 8, the rotating shaft 91 is borne on the resin molded body 94 integral with the housing 37 in the condition where the bearing support part 91a on one end side thereof is borne by the thrust bearing 86, the outer peripheral surface of the shaft body 91b thereof is borne by the radial bearing 93, and the side of the attaching part 32 provided on the other end side thereof is protruding through the shaft passing hole 101 provided in the top closing part 100 of the resin molded body main body 98.

In addition, the rotating shaft 91 is provided with a shaft slip-off preventive groove part 91c between the bearing support part 91a and the shaft body 91b. The passage forming member 114 is provided with a washer 89 as a shaft slip-off preventive section, so as to correspond to the shaft slip-off preventive groove part 91c. Engagement of the shaft slip-off preventive groove part 91c with the washer 89 enhances the property for handling at the time of assembly. The washer 89 is formed of a polymeric material such as nylon, polyamide, polyimide, etc. or a metal such as stainless steel, phosphor bronze, etc.

Meanwhile, the shaft passing hole 101 is formed with an inside diameter slightly greater than the outside diameter of the shaft body 91b so that the rotating shaft 91 passed through the shaft passing hole 101 is rotated without making frictional contact with the inner peripheral surface of the shaft passing hole 101. In this case, the shaft passing hole 101 is formed to provide a gap 105, with a spacing c sufficient for preventing the lubricating oil 42 filling the inside of the resin molded body 94 from leaking out of the resin molded body 94, between the inner peripheral surface of the shaft passing hole 101 and the outer peripheral surface of the shaft body 91b. The top closing part 100 thus provided with the shaft passing hole 101 so as to form, between itself and the rotating shaft 91, the gap 105 capable of preventing the lubricating oil 42 filling the inside of the resin molded body 94 from leaking, constitutes an oil seal part.

The inner peripheral surface, facing the outer peripheral surface of the rotating shaft 91, of the shaft passing hole 101 is provided with a tapered part 107. The tapered part 107 is so inclined as to enlarge, toward the outside of the resin molded body 94, the gap 105 formed between the outer peripheral surface of the rotating shaft 91 and the inner peripheral surface of the shaft passing hole 101. The tapered part 107 produces a pressure gradient in the gap 105 defined by the outer peripheral surface of the rotating shaft 91 and the inner peripheral surface of the shaft passing hole 101, thereby generating a force for pulling the lubricating oil 42 filling the inside of the resin molded body 94 into the inside of the resin molded body 94. At the time of rotation of the rotating shaft 91, the lubricating oil 42 is pulled into the inside of the resin molded body 94, so that the lubricating oil 42 assuredly enters into the dynamic pressure generating grooves 43, 44 in the radial bearing 93 composed of a dynamic pressure fluid bearing, to generate a dynamic pressure, whereby stable bearing of the rotating shaft 91 is realized, and the lubricating oil 42 filling the inside of the resin molded body 94 can be prevented from leaking.

In the bearing unit 90 according to an application of the present invention, the lubricating oil 42 for generating the dynamic pressure by entering into the dynamic pressure generating grooves 43, 44 provided in the radial bearing 93 constituting a dynamic pressure fluid bearing is placed to fill the inside of the resin molded body 94 and to front on the gap 105 defined by the outer peripheral surface of the rotating body 91 and the tapered part 107 of the shaft passing hole 101, as shown in FIG. 8. To be more specific, the lubricating oil 42 fills the cavities in the resin molded body 94 and, further, impregnates therewith the radial bearing 93 formed of a sintered metal.

Like the above-described bearing unit 30, the bearing unit 90 is advantageous in that scattering of the lubricating oil 42 can be prevented by controlling the spacing of the gap 105 and the height of the shaft passing hole 101, the force for pulling the lubricating oil 42 into the inside of the resin molded body 94 can be generated by providing the tapered part 107, air can be prevented from being engulfed in the lubricating oil 42, leakage of the lubricating oil 42 can be prevented, and, further, stable rotation of the rotating shaft 91 can be ensured.

The bearing unit 90 configured as above is attached to an object by a method in which the metallic housing 37a and the radial bearing 93 are fastened together by the resin molded body 94, and the caulking part 37 provided as an attaching section in the housing 37 is caulked onto the object, whereby reliability such as mechanical strength can be enhanced, and he bearing unit 90 can be attached to the object easily and assuredly.

In addition, in the bearing unit 90, the other parts than the metallic housing 37 are formed of resin material, i.e., the member containing the radial bearing 93, the thrust bearing 86 and the passage forming member 114 formed on the outside of them therein and filled with the lubricating oil 42 is composed of the resin molded body 94 formed by molding, whereby leakage of the lubricating oil can be prevented, and a good lubrication performance can be obtained.

To be more specific, in the bearing unit 90, the rotating shaft 91 is exposed only at one end on the shaft passing hole 101 side, and the other part than the slight gap at the shaft passing hole 101 is seamlessly covered with the resin molded body 94. Therefore, it is possible to prevent leakage due, for example, to oozing-out of the lubricating oil through a joint part in the case where the members to be filled with the lubricating oil are joined to each other, and to prevent the lubricating oil from being scattered due to shocks.

Therefore, in the bearing unit 90 according to this embodiment of the present invention, the radial bearing 93 for bearing the rotating shaft 91 in the circumferential direction of the rotating shaft 91 and the passage forming member 114 formed on the outside thereof and the metallic housing 37 provided with the attaching section are fastened together by molding, the resin molded body 94 formed by the molding is so formed as to sealingly contain the radial bearing 93 therein, the shaft passing hole 101 through which to pass the rotating shaft 91 is provided on one end side in the axial direction, and the inside of the resin molded body 94 is filled with the lubricating oil 42. Therefore, it is possible to prevent the lubricating oil 42 from leaking, to attach the bearing unit 90 to an object easily and assuredly, and to maintain a good lubrication performance for a long time through the prevention of leakage of the lubricating oil 42.

Besides, the bearing unit 90 configured as above solves the problem of the shaft one side released type dynamic pressure fluid bearing unit having a seamless resin-made housing in that though the bearing unit is very useful for prevention of leakage of a lubricating oil, the lubricating oil is liable to be pushed out by expansion of residual air or expansion of air dissolved in the lubricating oil (cavitation phenomenon) which would be generated simultaneously with the rotation of the shaft.

Specifically, the bearing unit 90 according to an application of the present invention includes the rotating shaft 91, the radial bearing 93 for bearing the rotating shaft 91 in the circumferential direction of the rotating shaft 91, the thrust bearing 86 for bearing one end in the thrust direction of the rotating shaft 91, the passage forming member 114 provided on the outside of the radial bearing 93 and the thrust bearing 86, the resin molded body 94 in the sealed inside of which the passage forming member 114 is disposed and which is provided on one end side in the axial direction thereof with the shaft passing hole 101 permitting the rotating shaft 91 to pass therethrough, the viscous fluid placed to fill the inside of the resin molded body 94, and the communicating passage 120 formed between the passage forming member 114 and the radial bearing 93 so as to establish communication between one end side in the thrust direction of the rotating shaft 91 protruding from the radial bearing 93 and the other end side, whereby the static pressure in the inside can be prevented from being lowered even when the rotating shaft 91 and the resin molded body 94 are rotated relative to each other to generate a dynamic pressure, the leakage phenomenon in which the lubricating oil is pushed out due to expansion of residual air in the resin molded body 94 or air dissolved in the lubricating oil can be prevented, and a good lubrication performance can be maintained.

Figure 13:
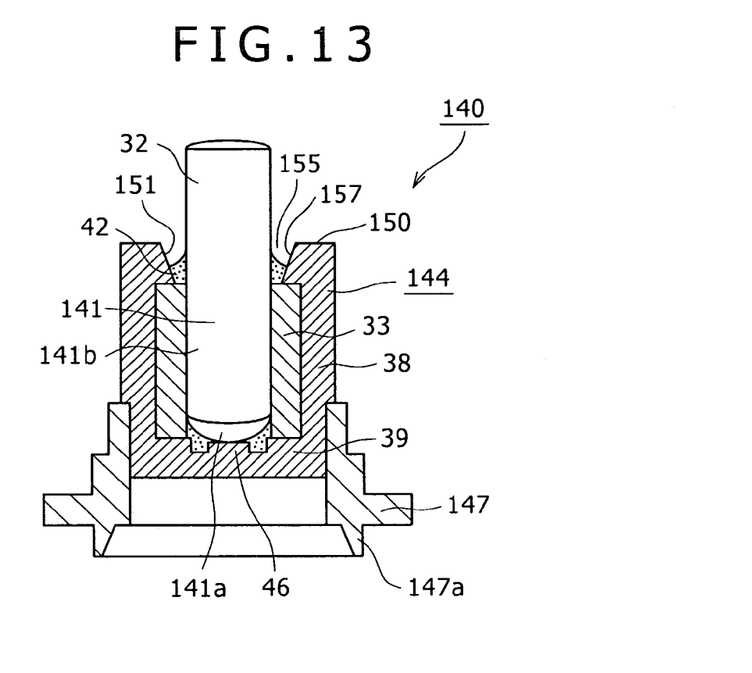
FIG. 13 is a sectional view showing a further example of the bearing unit according to one embodiment of the invention.

In addition, the bearing unit according to an application of the present invention is not limited to the above-described bearing units 30, 70, 90; for example, there may be adopted a configuration in which the length of the housing along the axial direction of the rotating shaft is reduced, as shown in FIG. 13. Incidentally, in the following description, the same parts as those in the bearing unit 30 shown in FIG. 2 above will be denoted by the same symbols as used above, and detailed description of the parts will be omitted.

The bearing unit 140 shown in FIG. 13 includes a radial bearing 33 for bearing a rotating shaft 141 in the circumferential direction of the rotating shaft 141, a resin molded body 144 formed on the outer peripheral side of the radial bearing 33 by molding, and a housing 147 provided on the outside of the resin molded body 144.

As shown in FIG. 13, the resin molded body 144 formed on the outside of the radial bearing 33 is a molded resin body having such a shape as to contain and surround the substantially cylindrical radial bearing 33, and is a single member formed by integral molding of a synthetic resin. The resin molded body 144 is formed at the time when the radial bearing 33 and the metallic housing 147 are fastened to each other by the molding. Specifically, the resin molded body 144 molded in the metallic housing 147 by so-called insert molding integrally fastens the housing 147 and the radial bearing 33 contained in the resin molded body 144.

As shown in FIG. 13, the resin molded body 144 includes a tubular resin molded body main body 38, a bottom closing part 39 constituting a one end side part formed as one body with the resin molded body main body 38 so as to close one end side of the resin molded body main body 38, and a top closing part 150 formed as one body with the resin molded body main body 38 and constituting the other end side of the resin molded body main body 38. The top closing part 150 is provided in a central portion thereof with a shaft passing hole 151 through which to pass the rotating body 141 rotatably borne by the radial bearing 33 contained in the resin molded body 144.

Specifically, the resin molded body 144 is formed on the outer peripheral side of the radial bearing 33 so as to sealingly contain the radial bearing 33 therein, and is provided on one end side in the axial direction with the shaft passing hole 151 through which the rotating shaft 141 is passed.

A bottom part of the resin molded body 144 is integrally provided in its inside central portion with a thrust bearing 46 for rotatably bearing a bearing support part 141a provided at one end portion in the thrust direction of the rotating shaft 141 borne by the radial bearing 33. Specifically, the thrust bearing 46 is formed simultaneously with the molding of the resin molded body 144, and is used in common with the bottom closing part 39. The thrust bearing 46 is formed as a pivot bearing for bearing on a point basis the bearing support part 141a, formed in an arcuate shape or a tapered shape, of the rotating shaft 141.

The resin molded body 144 configured as above is formed as one body in the condition where the radial bearing 33 is disposed on the inner peripheral side of the resin molded body main body 38 and the housing 147 is disposed on the outer peripheral side of the resin molded body main body 38, by insert molding a synthetic resin material on the inside of the housing 147 so as to envelope the substantially tubular radial bearing 33.

As the synthetic resin material constituting the resin molded body 144, the same material as those used for the resin molded body 34 mentioned above may be used.

Like the above-mentioned housing 37, the housing 147 of the bearing unit 140 is formed of a metal such as brass, and is integrated with the radial bearing 33 in the state of being fastened to the radial bearing 33 by the resin molded body 144. Here, the metallic material constituting the housing 147 is not limited to brass. In addition, the housing 147 is provided with a caulking part 147a as an attaching section, like the caulking part 37a of the housing 37 described above. Besides, unlike the above-described housing 37 so formed as to cover the side surface of the resin molded body from one end portion to the other end portion, the housing 147 here is formed in such a size as to secure a strength necessary for fastening to an object, i.e., formed in a required minimum size for securing a required strength, and is fastened at a part of the side surface of the resin molded body 144.

Since the bearing unit 140 is attached to a stator yoke 13 of a stator 12 serving as the object by caulking the caulking part 147a of the metallic housing 147, reliability such as mechanical strength can be enhanced, and the bearing unit 140 can be fastened and attached to the object easily and assuredly.

The rotating shaft 141 rotatably borne by the radial bearing 33 disposed inside the resin molded body 144 and the thrust bearing 46 provided as one body with the resin molded body 144 has a configuration in which a bearing support part 141a, rotatably bone by the thrust bearing 46, of a shaft body 141b is formed in an arcuate shape or a tapered shape, and an attaching part 32 to which a rotating body, for example, a rotor 11 of a motor 1 is to be attached is provided on the other end side. Here, the shaft body 141b and the attaching member 32 are formed to be equal in diameter.

As shown in FIG. 13, the rotating shaft 141 is borne by the resin molded body 144 integral with the housing 147 in the condition where the bearing support part 141a on one end side thereof is borne by the thrust bearing 46, while the outer peripheral surface of the shaft body 141b thereof is borne by the radial bearing 33, and the side of the attaching part 32 provided on the other end side thereof is made to protrude through the shaft passing hole 151 provided in the top closing part 150 of the resin molded body main body 38.

Meanwhile, the shaft passing hole 151 is formed with an inside diameter slightly greater than the outside diameter of the shaft body 141b so that the rotating shaft 141 passed through the shaft passing hole 151 is rotated without making frictional contact with the inner peripheral surface of the shaft passing hole 151. In this case, the shaft passing hole 151 is so formed as to provide, between its inner peripheral surface and the outer peripheral surface of the shaft body 141b, a gap 155 with such a spacing c as to be sufficient for preventing the lubricating oil 42 filling the inside of the resin molded body 144 from leaking out of the resin molded body 144. The top closing part 150 thus provided with the shaft passing hole 151 so as to form, between itself and the rotating shaft 141, the gap 155 for preventing the leakage of the lubricating oil 42 filling the inside of the resin molded body 144, constitutes an oil seal part.

The inner peripheral surface, facing the outer peripheral surface of the rotating shaft 141, of the shaft passing hole 151 is provided with a tapered part 157. The tapered part 157 is so inclined as to enlarge, toward the outside of the resin molded body 144, the gap formed between the outer peripheral surface of the rotating shaft 141 and the inner peripheral surface of the shaft passing hole 151. The tapered part 157 produces a pressure gradient in the gap 155 defined by the outer peripheral surface of the rotating shaft 141 and the inner peripheral surface of the shaft passing hole 151, thereby generating a force for pulling the lubricating oil 42 filling the inside of the resin molded body 144 into the inner side of the resin molded body 144. At the time of rotation of the rotating shaft 141, the lubricating oil 42 is pulled into the inner side of the resin molded body 144, so that the lubricating oil 42 enters into dynamic pressure generating grooves 43, 44 of the radial bearing 33 composed of a dynamic pressure fluid bearing, to generate a dynamic pressure, whereby stable bearing of the rotating shaft 141 is realized, and leakage of the lubricating oil 42 filling the inside of the resin molded body 144 can be prevented.

In the bearing unit 140 according an application of the present invention, the lubricating oil 42 for generating the dynamic pressure by entering into the dynamic pressure generating grooves 43, 44 provided in the radial bearing 33 constituting the dynamic pressure fluid bearing is placed so as to fill the inside of the resin molded body 144 and to front on the gap 155 formed by the outer peripheral surface of the rotating shaft 141 and the tapered part 157 of the shaft passing hole 151. Specifically, the lubricating oil 42 fills the cavities inside the resin molded body 144, and, further, impregnates therewith the radial bearing 33 composed of a sintered metal.

Like the bearing unit 30 described above, the bearing unit 140 is advantageous in that scattering of the lubricating oil 42 can be prevented by regulating the spacing of the gap 155 and the height of the shaft passing hole 151, the force for pulling the lubricating oil 42 into the inside of the resin molded body 144 can be generated by providing the tapered part 157, air can be prevented from engulfing into the lubricating oil 42, leakage of the lubricating oil 42 can be prevented, and, further, stable rotation of the rotating shaft 141 can be ensured.

In the bearing unit 140 configured as above, the metallic housing 147 and the radial bearing 33 are integrally fastened together by the resin molded body 144, and the bearing unit 140 is attached to an object by caulking the caulking part 147a provided as the attaching section in the housing 147, whereby reliability such as mechanical strength can be enhanced, and the bearing unit 140 can be attached to the object easily and assuredly.

Besides, in the bearing unit 140, the other parts than the metallic housing 147 are formed of resin material, i.e., the members containing the radial bearing 33 and the thrust bearing 46 therein and filled with the lubricating oil 42 are composed of the resin molded body 144 formed by molding, whereby leakage of the lubricating oil can be prevented, and a good lubrication performance can be obtained.

Specifically, in the bearing unit 140, the rotating shaft 141 is exposed only at one end on the shaft passing hole 151 side, and the other parts than the slight gap at the shaft passing hole 151 are seamlessly covered with the resin molded body 144, so that it is possible to prevent the possibility of leakage due, for example, to oozing-out of the lubricating oil through a joint part in the case where the members to be filled with the lubricating oil are joined to each other, and to prevent the lubricating oil from being scattered due to shocks.

Therefore, the bearing unit 140 according to an application of the present invention has a configuration in which the radial bearing 33 for bearing the rotating shaft 141 in the circumferential direction of the rotating shaft 141 and the metallic housing 147 provided with the attaching section are fastened together by molding, the resin molded body 144 formed by the molding is so formed as to sealingly contain the radial bearing 33 and is provided on one end side in the axial direction thereof with the shaft passing hole 151 through which to pass the rotating shaft 141, and the inside of the resin molded body 144 is filled with the lubricating oil 42, so that leakage of the lubricating oil 42 can be prevented, the bearing unit 140 can be attached to an object easily and assuredly, and a good lubrication performance can be maintained for a long time through the prevention of leakage of the lubricating oil 42.

In addition, in the bearing unit 140 according to an application of the present invention, the metallic housing 147 is not formed to cover the resin molded body 144 to end portions but formed in such a size as to secure a strength required for fastening the bearing unit 140 to an object, so that the bearing unit 140 can be reduced in size in the radial direction, a reduction in the overall size of the device can be realized, and a reduction in cost can be realized through reducing the size of the metallic housing formed of a comparatively expensive material.

Incidentally, while the above-described bearing units 30, 70, 90 and 140 each use a lubricating oil as the viscous fluid for filling the inside of the resin molded body, various other viscous fluids can be appropriately selected inasmuch as they have a certain viscosity and can attain a certain surface tension.

The motor 1 according to an application of the present invention includes the bearing unit 30, 70, 90 or 140 for bearing a rotor 11 rotatably relative to a stator 12, which ensures that the bearing unit 30, 70, 90 or 140 can be attached to the stator 12 or the like object easily and assuredly, leakage of the lubricating oil can be prevented, and a good lubrication performance can be obtained.

The bearing unit according to an embodiment of the present invention can be used not only as a bearing in a cooling fan motor of a radiating device or a spindle motor in a disk drive but also as a bearing in any of other various motors.

Furthermore, the use of the bearing unit according to an embodiment of the present invention is not limited to motors, and the bearing unit can be widely used for mechanisms having a rotating shaft and for mechanisms for bearing a part rotated relative to a shaft.

It should be understood by those skilled in the art that various modifications, combinations, sub-combinations and alterations may occur depending on design requirements and other factors insofar as they are within the scope of the appended claims or the equivalents thereof.

What is claimed is:
1. A bearing unit comprising:
   a radial bearing for bearing a shaft in the circumferential direction of said shaft and a metallic housing provided with an attaching section are integrated with each other by molding,
   a resin molded body formed by said molding is so formed as to sealingly contain said radial bearing, and is provided on one end side in the axial direction thereof with a shaft passing hole through which to pass said shaft, and the inside of said resin molded body is filled with a viscous fluid, wherein said radial bearing is a dynamic pressure fluid bearing, and wherein a passage forming member provided with a communicating passage for communication between one end side and the other end side in a thrust direction of said radial bearing is further contained sealedly in said resin molded body formed by said molding.

2. The bearing unit as set forth in claim 1, wherein said attaching section is a caulking part.

3. The bearing unit as set forth in claim 1, wherein said resin molded body formed by said molding is integrally provided with a thrust bearing for bearing one end in a thrust direction of said shaft.

4. The bearing unit as set forth in claim 1, wherein said radial bearing is a sintered oil retaining bearing.

5. A motor comprising a bearing unit for bearing a rotor rotatably relative to a stator, wherein said bearing unit includes a radial bearing for bearing a shaft in the circumferential direction of said shaft, and a metallic housing provided with an attaching section, said radial bearing and said metallic housing being integrated with each other by molding; a resin molded body formed by said molding is so formed as to sealingly contain said radial bearing, and is provided on one end side of the axial direction thereof with a shaft passing hole through which to pass said shaft; and the inside of said resin molded body is filled with a viscous fluid, wherein said radial bearing of said bearing unit is a dynamic pressure fluid bearing, and a passage forming member provided with a communicating passage for communication between one end side and the other end side in a thrust direction of said radial bearing is further contained sealedly in said resin molded body formed by said molding.

6. The motor as set forth in claim 5, wherein said attaching section is a caulking part.

7. The motor as set forth in claim 5, wherein said resin molded body formed by said molding is integrally provided with a thrust bearing for bearing one end in a thrust direction of said shaft.

8. The motor as set forth in claim 5, wherein said radial bearing is a sintered oil retaining bearing.

* * * * *